Sept. 22, 1959 J. F. MOORE ET AL 2,905,616
AUTOMATIC CONTROL OF CHILLED SOLUTIONS
Filed July 11, 1956 2 Sheets-Sheet 1
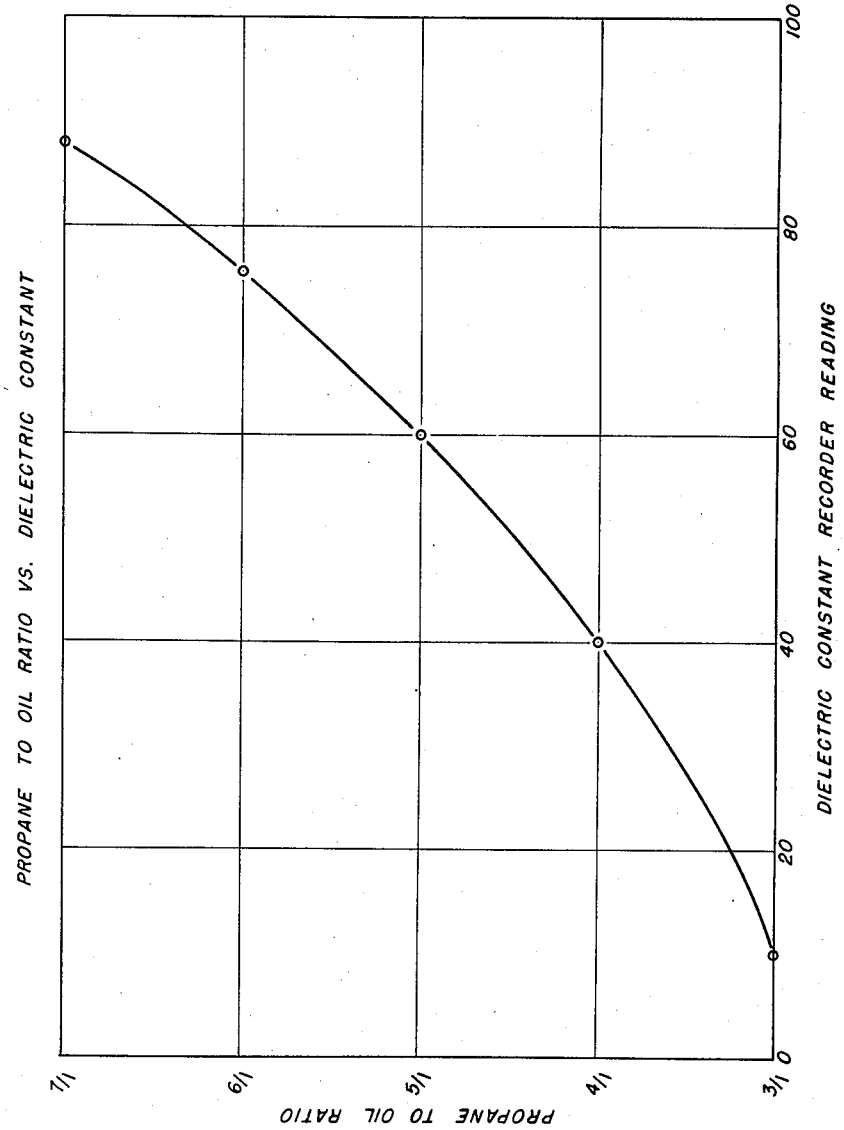
INVENTOR.
Joe F. Moore,
Benjamin W. Thomas,
BY
ATTORNEY.

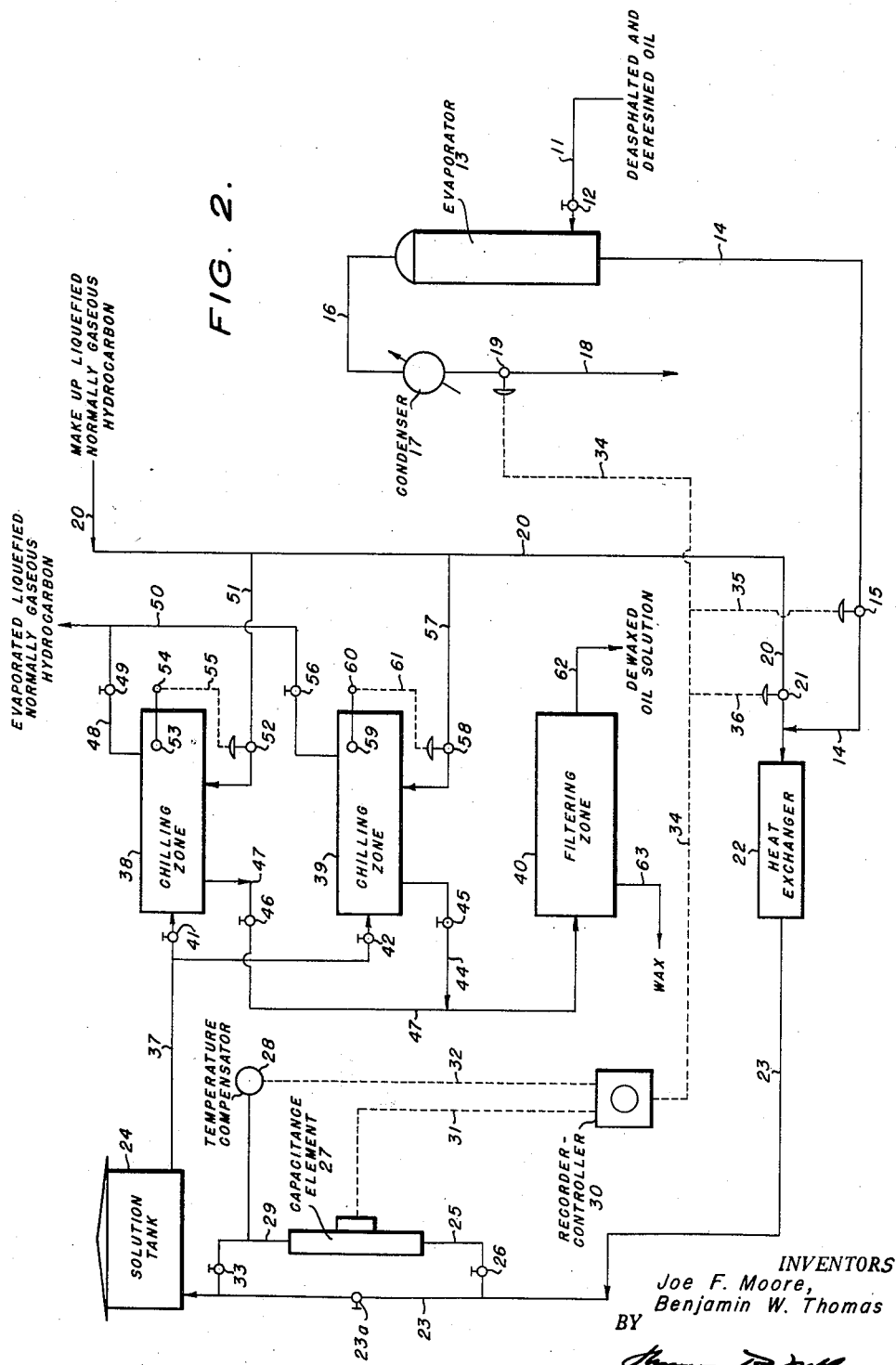

United States Patent Office 2,905,616
Patented Sept. 22, 1959

2,905,616

AUTOMATIC CONTROL OF CHILLED SOLUTIONS

Joe F. Moore and Benjamin W. Thomas, Baytown, Tex., assignors, by mesne assignments, to Esso Research and Engineering Company, Elizabeth, N.J., a corporation of Delaware Application July 11, 1956, Serial No. 597,111

8 Claims. (Cl. 208—35)

The present invention is directed to a method for controlling chilled solutions. More particularly, the invention is directed to a method for controlling the ratio of components of a chilled solution. In its more specific aspects the invention is directed to maintaining the ratio of a liquefied normally gaseous hydrocarbon to oil in a solution charged to a chilling operation wherein a portion of the liquefied normally gaseous hydrocarbon is evaporated.

The present invention may be briefly described as a method for controlling the ratio of normally gaseous hydrocarbon to oil within the range of about 3:1 to about 7:1 in a chilling operation wherein the temperature of a solution having as components a lubricating oil fraction dissolved in said liquefied normally gaseous hydrocarbon is lowered by evaporation of a portion of the liquefied normally gaseous hydrocarbon from the solution. The particular feature of the invention comprises the steps of flowing a portion of the solution through a capacitance cell of a dielectric constant meter to obtain a signal which is a function of the ratio mentioned before. The signal is employed to control the amount of one of the components of the solution added to the solution whereby the ratio is maintained within the range. The solution is then chilled by evaporation of a portion of the liquefied normally gaseous hydrocarbon.

The amount of the liquefied normally gaseous hydrocarbon added to the solution may be controlled or the amount of the lubricating oil fraction added to the solution may be controlled. For example, the amount of propane added to a solution may be decreased or increased as demand requires or, if it is desired, to decrease the ratio of propane to oil, the propane in the solution may be held constant while the amount of the oil added to the solution may be increased or the propane may be held constant and the amount of oil decreased as demand requires.

The liquefied normally gaseous hydrocarbon is preferably propane but may be a mixture of ethane, propane and the butanes or the liquefied normally gaseous hydrocarbon may be either ethane, propane or one of the butanes or mixtures of the butanes.

The present invention is of considerable importance and utility in that it is particularly useful in a chilling operation wherein a waxy oil is chilled by evaporation of liquefied normally gaseous hydrocarbon from a solution of the oil in the propane. In such operations the solution is chilled in chilling zones by evaporation of the propane and thereafter the chilled solution is charged to a filtering zone to remove the wax crystals therefrom by filtration. Since the chilling operation is usually conducted in chillers where the solution must be maintained for a sufficient length of time, it is sometimes difficult to maintain the chilling operation in balance with the filtering operation. The desirable operation is to have the filtering and chilling operations of substantially equal length of time. Otherwise part of the system will be operating while the other part of the system will be idle or it may be necessary to provide an excessive number of chillers or an excessive number of filters. The present invention overcomes the unbalance that is encountered in prior art operations because the ratio of propane to oil is maintained at a proper level to allow chilling at a rate consistent with maximum throughput.

The present invention is based on the discovery that the lubricating oil solution charged to a chilling operation has a dielectric constant value which differs considerably from the dielectric constant value for propane and the other liquefied normally gaseous hydrocarbons. For example, propane has a dielectric constant value of about 1.5 whereas a deasphalted lubricating oil fraction from the Texas oil fields has a dielectric constant value in the range from about 2.2 to about 2.4. This difference in dielectric constant values allows a solution of the lubricating oil and propane to be passed through the capacitance cell of a dielectric constant meter to obtain a reading and a signal which is the function of the ratio of propane to oil in the solution. For example, it has been found that as the propane to oil ratio changes in the preferred range from about 3:1 to about 7:1, the dielectric constant value of the mixture drops from about 1.675 to about 1.5806. This allows a control of the operation.

The present invention will be further illustrated by reference to the drawings in which:

Fig. 1 is a plot of data showing the relationship between the propane to oil ratio and a dielectric constant recorder reading; and, Fig. 2 is a flow diagram of a preferred mode of operating the invention.

Various solutions of propane to oil were made up and passed through the capacitance cell of a dielectric constant meter. The following table shows the relationship between the preferred range of propane to oil ratios and the dielectric constant recorder reading. These data are also shown in Table I:

Table I

| Propane to oil ratio | Dielectric constant recorder reading |
|---|---|
| 3:1 | 10 |
| 4:1 | 40 |
| 5:1 | 60 |
| 6:1 | 76 |
| 7:1 | 88 |

It will be seen from the data in the table and Fig. 1 that the dielectric constant recorder reading changes as the propane to oil ratio changes. Therefore, this value may be used to control the amount of propane or oil in the solution.

Referring now to Fig. 2, numeral 11 designates a charge line through which a deasphalted and deresined oil in propane solution is introduced into the system from a deasphalting and deresining operation such as is found in many commercial oil refining operations. Line 11 is controlled by valve 12 and the deasphalted and deresined oil solution is introduced into an evaporator 13 in which an amount of the propane is evaporated to remove a portion of the solvent. This is accomplished by increasing the temperature of the solution from about 140° to about 155° F. The solution is withdrawn from evaporator 13 by line 14 controlled by valve 15 while the evaporated propane is withdrawn by line 16, passed through a condenser 17 and then through a line 18 controlled by valve 19 which connects into a propane storage vessel not shown.

The cooled solution in line 14 is introduced through valve 15 into line 20 controlled by valve 21 and then passes through a heat exchanger 22 wherein the temperature is adjusted to a temperature of about 95° F. following which the oil solution containing propane is discharged by way of line 23 into a solution tank 24. On passage through line 23 a portion or all of the oil is discharged by way of line 25 controlled by valve 26 into a capacitance element or cell 27 of a dielectric constant meter. Valve 23a allows the flow through line 23 to be controlled or shut off as desired. The dielectric constant element is a cylindrical member with an insulated metal rod mounted coaxially therein. A temperature compensator 28 is connected into line 29 through which the oil discharges from the element 27, the element 27 and the compensator 28 connecting respectively to a recorder-controller 30 by electrical conductors 31 and 32. The oil from line 29 controlled by valve 33 flows back into line 23 and thence into tank 24 as has been described. Since the signal from the recorder-controller 30 is a function of the ratio of propane to oil this signal may be suitably used to position control valve 21, valve 15, or valve 19. To this end these several valves are connected to the dielectric constant element by suitably electrical connecting means 34, 35 and 36, as is shown in the drawing. Thus, the recorder-controller 30 may be used to position valve 21 to decrease or increase the amount of propane added into line 23 and which passes through heat exchanger 22 or to increase or decrease the amount of oil solution flowing through line 14 by throttling valve 15. Likewise by controlling the amount of evaporation from evaporator 13 by opening or closing valve 19, the amount of propane in the oil solution may likewise be controlled. The solution of oil in propane discharges from tank 24 by way of line 37 into either of chilling zones 38 or 39. While one zone is undergoing a chilling cycle, the other zone may be employed to feed the chilled oil into a filter zone 40. Assuming that chilling zone 38 is on the chilling cycle, valve 41 in line 37 will be opened and valve 42 in line 43 will be closed. Likewise, line 44 controlled by valve 45 will connect chilling zone 39 to the filtering zone 40 while valve 46 in line 47 will be closed such that the chilling operation is conducted in zone 38. Propane is evaporated from chilling zone 38 by way of line 48 controlled by valve 49 such that propane is discharged by way of line 50. Make-up propane may be introduced into zone 38 by way of line 20 and branch line 51 controlled by valve 52. Valve 52 may be a float-operated valve operated through float 53 and actuating member 54 and connecting means 55.

After the oil in chilling zone 38 has been suitably chilled then the chilling zone 38 is connected into filtering zone 40 by opening valve 46. Likewise, chilling zone 39 having discharged its chilled oil to filtering zone 40, chilling zone 39 will then be filled with oil from tank 24 and caused to undergo the chilling operation by evaporation of propane from the solution through line 50 controlled by valve 56 with make-up propane being added thereto through line 20 and branch line 57 controlled by valve 58 through float member 59 and actuating member 60 through connecting means 61.

The dewaxed oil solution may be removed from the filtering zone 40 by way of line 62 while wax is removed from the filtering surface and discharged by line 63.

It will be seen from the foregoing description that an improved control method has been provided for controlling the ratio of propane to oil.

The propane to oil ratio in solutions of the nature described herein varies considerably due to a number of factors. For example, it is usual practice to operate a propane dewaxing system in conjunction with a deasphalting and deresining system. Thus, the propane to oil ratio of the solution from the deasphalting and dewaxing operations varies in both oil and propane content for any one of several reasons. For example, there is a variable charge oil rate. The propane varies in rate because it is obtained from several places in an integrated system and hence varies in volume. The system wherein deasphalting is employed is sensitive to temperatures because of asphalt solubility and hence the oil charged to the dewaxing system varies considerably. There are many other variations in the operations which cause the propane and oil ratio to change which make it quite difficult to maintain a constant ratio of propane to oil. A varying ratio of propane to oil affects the chilling operation and the filtering operation.

The present invention is particularly applicable and advantageous in controlling the ratio of solvent to oil wherein the ratio being controlled is in a system or unit operating in series with other systems or units and wherein the system being controlled is not the first unit to which the solution is fed. Thus, the present invention is applicable where deasphalting, deresining and dewaxing operations are being conducted and in which the solution of solvent and oil is processed as it passes through each of the several operations.

The present invention has been employed to control a commercial operation wherein the solution was passed to a dielectric constant meter and employed to control propane to oil ratio. As a result of these operations the ratio of propane to oil has been maintained substantially constant which has resulted in the chilling operations and filtering operations being placed in balance allowing the charging of maximum amounts of oil and to maintain maximum equipment utilization which heretofore was not possible.

The present invention is susceptible to many variations and the relative amounts of propane and oil in the solution undergoing chilling may be varied by either adding more propane or oil to the solution, changing the pressure of the solution or the temperature of the solution whereby more or less of the propane will be evaporated. Thus, by evaporating more propane the ratio will be effectively changed or by increasing the temperature and maintaining the pressure constant the ratio may be changed.

The dielectric constant meter employed in the practice of the present invention is suitably one of the type described in Analytical Chemistry, vol. 23, page 1750, December 1951, by Thomas, Faegin and Wilson. The recorder-controller may suitably be one such as marketed by the Brown Instrument Company or the recorder-controller may be a Foxboro Capacitance Dynalog Recorder, such as manufactured by the Foxboro Company, Foxboro, Massachusetts. Other suitable dielectric constant meters and the other suitable recorder-controllers may be used.

The nature and objects of the present invention having been completely described and illustrated, what we wish to claim as new and useful and to secure by Letters Patent is:

1. A method for controlling the ratio of a liquefied normally gaseous hydrocarbon to oil within a range of about 3:1 to about 7:1 in a chilling operation wherein the temperature of a solution having as components a lubricating oil fraction dissolved in said liquefied normally gaseous hydrocarbon is lowered by evaporation of a portion of the liquefied normally gaseous hydrocarbon from the solution which comprises the steps of flowing at least a portion of said solution through a capacitance cell of a dielectric constant meter to obtain a signal which is a function of changes in the dielectric constant of said solution from a dielectric constant in the range 1.675 to 1.5806 employing said signal to control the amount of one of the components of the solution added to said solution whereby said hydrocarbon to oil ratio is maintained within said range and then chilling the solution.

2. A method in accordance with claim 1 in which the liquefied normally gaseous hydrocarbon is propane.

3. A method in accordance with claim 1 in which the amount of liquefied normally gaseous hydrocarbon is changed.

4. A method in accordance with claim 1 in which the amount of lubricating oil fraction is changed.

5. A method for controlling the ratio of propane to oil within a range of about 3:1 to about 7:1 in a chilling operation wherein the temperature of a solution having as components a paraffinic lubricating oil fraction dissolved in said propane is lowered by evaporation of a portion of the propane from the solution which comprises the steps of flowing at least a portion of the said solution through the capacitance cell of a dielectric constant meter to obtain a signal which is a function of changes in dielectric constant in the range 1.675 to 1.5806 and employing said signal to control the amount of propane in said solution whereby said ratio is maintained within the range 3:1 to about 7:1.

6. A method in accordance with claim 5 in which the amount of propane in said solution is maintained by varying the amount of lubricating oil charged to said solution.

7. A method in accordance with claim 5 in which the amount of propane in said solution is maintained by controlling the pressure of the solution whereby the amount of propane evaporated from the solution is varied.

8. A method in accordance with claim 5 in which the amount of propane in said solution is maintained by varying the temperature of the solution while maintaining the pressure constant.

References Cited in the file of this patent

UNITED STATES PATENTS

| | | |
|---|---|---|
| 1,988,706 | Swift | Jan. 22, 1935 |
| 2,007,546 | Petty | July 9, 1935 |
| 2,303,721 | Brandt | Dec. 1, 1942 |
| 2,530,976 | Martin | Nov. 21, 1950 |
| 2,577,612 | Fay | Dec. 4, 1951 |
| 2,672,880 | Hermanson | Mar. 23, 1954 |
| 2,737,469 | Anderson et al. | Mar. 6, 1956 |
| 2,783,420 | Thompson et al. | Feb. 26, 1957 |

OTHER REFERENCES

Chamberlain et al.: Industrial and Engineering Chemistry, vol. 48, No. 11, November 1956, pp. 1990–1995.